(12) United States Patent
Beitzel

(10) Patent No.: US 12,253,109 B2
(45) Date of Patent: Mar. 18, 2025

(54) FOLDING IMPLEMENT WITH FIXED BEARING SURFACE FOR ROTATABLE TOOL

(71) Applicant: Karl Beitzel, Canton, OH (US)

(72) Inventor: Karl Beitzel, Canton, OH (US)

( * ) Notice: Subject to any disclaimer, the term of this patent is extended or adjusted under 35 U.S.C. 154(b) by 315 days.

(21) Appl. No.: 17/946,206

(22) Filed: Sep. 16, 2022

(65) Prior Publication Data
US 2024/0093724 A1 Mar. 21, 2024

(51) Int. Cl.
*F16C 19/06* (2006.01)
*B26B 1/04* (2006.01)
*F16C 33/32* (2006.01)

(52) U.S. Cl.
CPC .............. *F16C 19/06* (2013.01); *B26B 1/04* (2013.01); *F16C 33/32* (2013.01)

(58) Field of Classification Search
None
See application file for complete search history.

(56) References Cited

U.S. PATENT DOCUMENTS

| | | | |
|---|---|---|---|
| 5,699,615 A * | 12/1997 | Chen | B26B 1/044 |
| | | | 30/267 |
| 8,893,389 B2 * | 11/2014 | Freeman | B26B 1/046 |
| | | | 30/155 |
| 8,939,054 B2 | 1/2015 | Hawk et al. | |
| 8,966,768 B2 | 3/2015 | Onion | |
| 10,071,489 B2 | 9/2018 | MacNair et al. | |
| 11,548,174 B2 * | 1/2023 | DeBaker | B26B 1/044 |
| 2002/0003228 A1 * | 1/2002 | Niwa | C04B 35/5611 |
| | | | 252/521.1 |
| 2007/0137047 A1 * | 6/2007 | Kim | B26B 1/046 |
| | | | 30/161 |
| 2017/0144316 A1 * | 5/2017 | Trull | B25G 1/00 |
| 2020/0338766 A1 * | 10/2020 | Huang | B26B 5/00 |
| 2021/0364038 A1 * | 11/2021 | Ilie | F16C 33/586 |
| 2024/0093724 A1 * | 3/2024 | Beitzel | F16C 19/06 |

* cited by examiner

*Primary Examiner* — Hwei-Siu C Payer
(74) *Attorney, Agent, or Firm* — Hudak, Shunk & Farine Co. LPA

(57) ABSTRACT

A folding implement such as a knife having a handle and a blade or tool rotatably connected to the handle by a fixed bearing surface. The handle includes a first scale or side and a second scale or side, wherein a first fixed bearing surface is connected to the first scale and a second fixed bearing surface is connected to the second scale, with the blade or tool positioned between the first scale and second scale and in contact with the bearing surfaces. The bearing surfaces contact an adjacent side surface of the tang of the blade or tool and sweep there across when being moved from a closed position to an open position or vice-versa. The bearing surfaces are fixed in the scales and do not rotate thereby providing a consistently reliable mechanism for reducing operating friction.

20 Claims, 6 Drawing Sheets

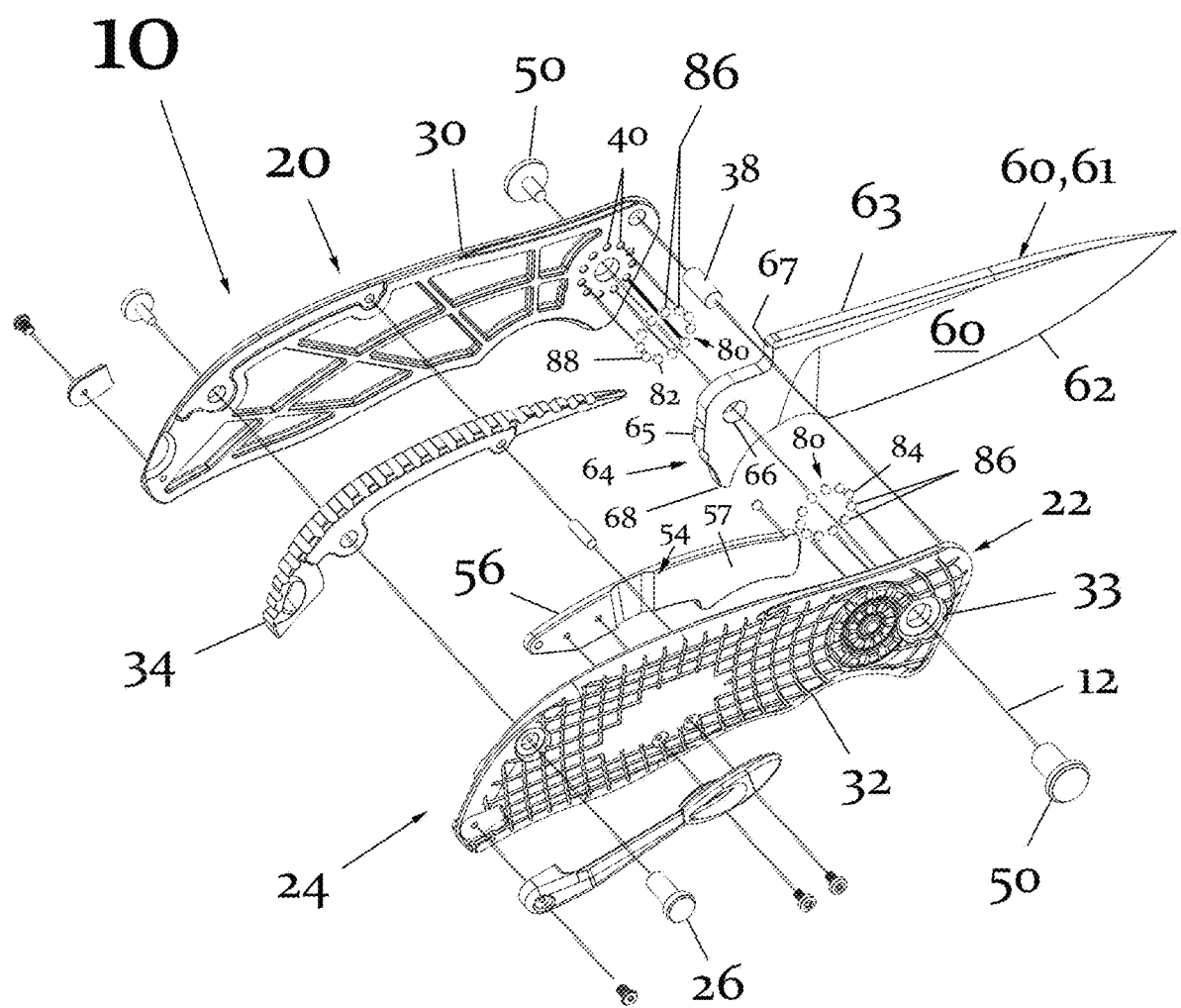

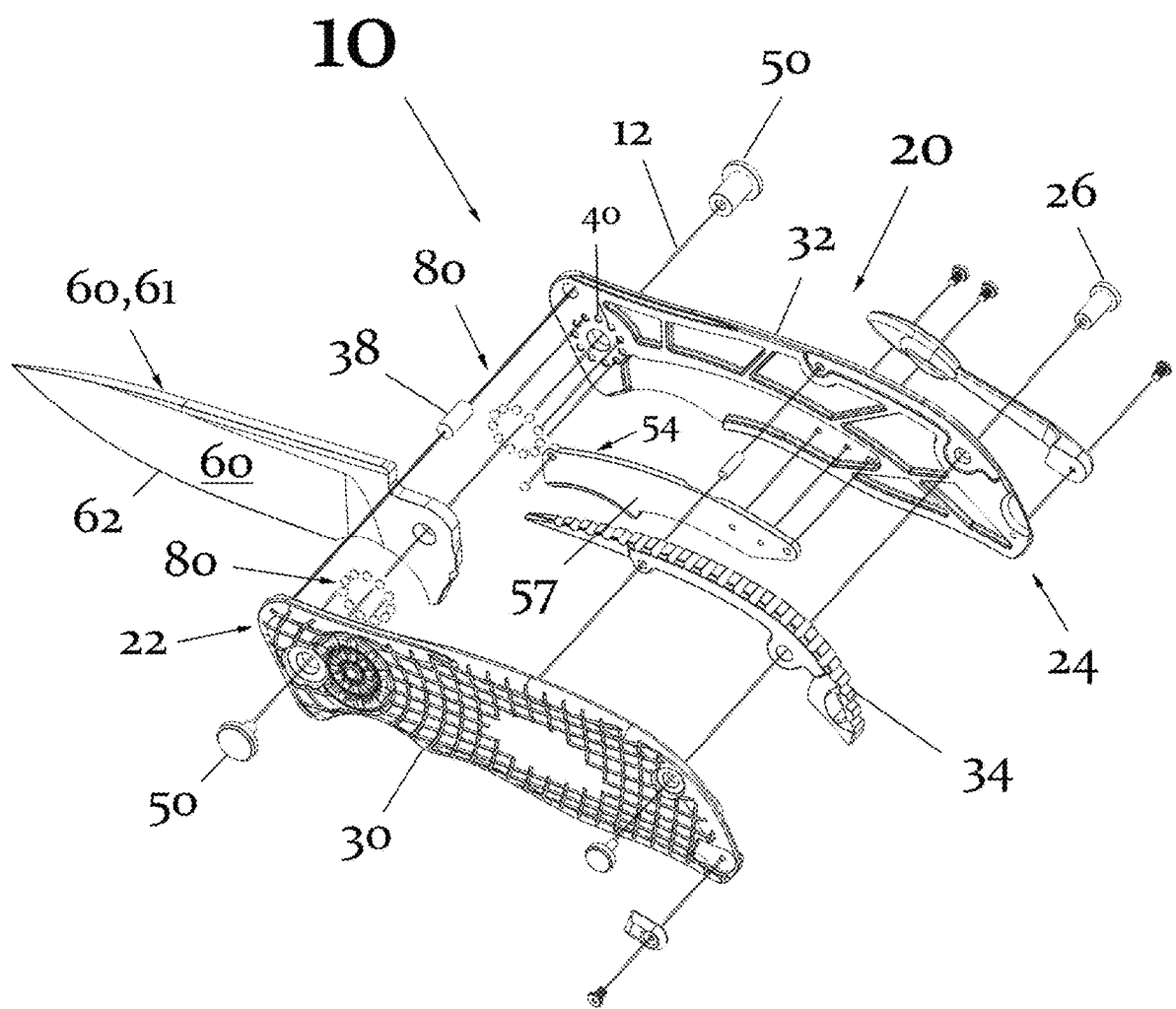

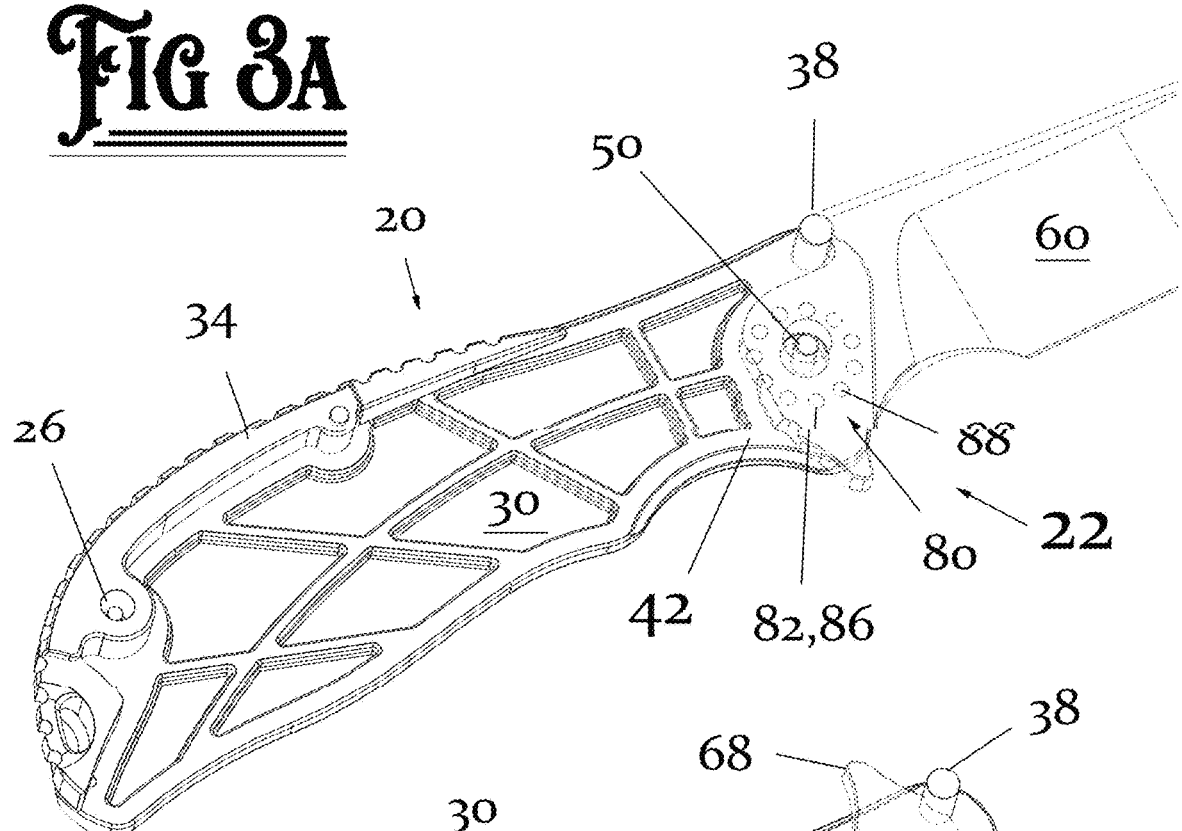
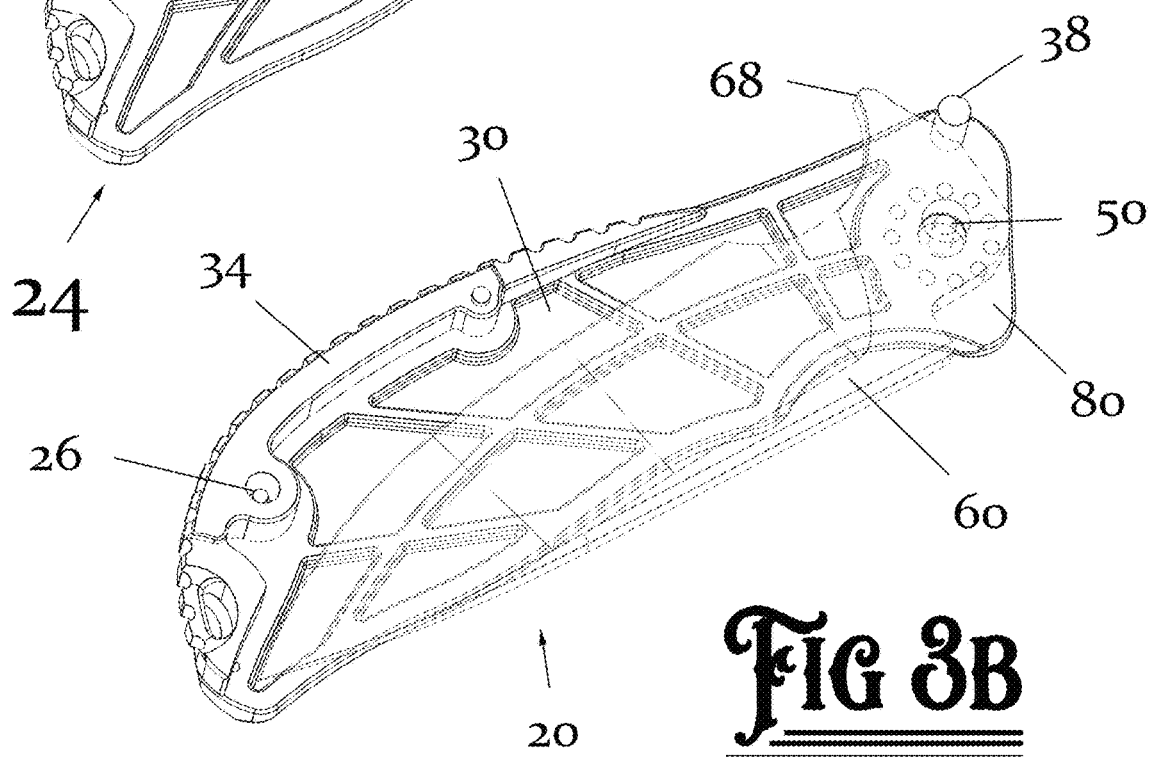

FOLDING IMPLEMENT WITH FIXED BEARING SURFACE FOR ROTATABLE TOOL

FIELD OF THE INVENTION

The present invention relates to a folding implement such as a knife having a handle and a blade or tool rotatably connected to the handle by a fixed bearing surface. The handle includes a first scale or side and a second scale or side, wherein a first fixed bearing surface is connected to the first scale and a second fixed bearing surface is connected to the second scale, with the blade or tool positioned between the first scale and second scale and in contact with the bearing surfaces. The bearing surfaces contact an adjacent side surface of the tang of the blade or tool and sweep there across when being moved from a closed position to an open position or vice-versa. The bearing surfaces are fixed in the scales and do not rotate thereby providing a consistently reliable mechanism for reducing operating friction.

BACKGROUND OF THE INVENTION

Folding implements, in particular knives, are often more desirable for users as compared to fixed tool implements because they are more easily carried when folded and, when the implement is a knife, the blade cutting can be stored within the knife handle without the need for a sheath or other protective cover.

Many different washer and thrust bearing systems have been used in the art to facilitate folding and unfolding of implements in an effort to ensure smooth operation. A variety of components have been used, including polymer washers, metal washers, rolling ball bearings, roller bearings, caged bearings, and the like.

Plastic and metal washers have been used to aid in blade centering and provide a pivot bearing surface. Plastic washers are relatively soft and often do not provide great lateral stability. Washers have a large contact area with the pivoting knife blade/tool paired with a significant coefficient of friction. Metal washers require lubrication which can gather debris or be washed away when under water, and often a significant a brake-in period. Metal washers can cause relatively high friction and many knives containing the same cannot be opened with one hand. Both forms of washers are extra parts that can be damaged or lost during disassembly and cleaning of a knife. Many washer-containing knives are difficult to open, often thereby requiring spring assistance or two-hand opening and closing. Washers located on a locking side of a knife also have to be fabricated small enough to avoid interference with lock bar geometry.

Loose ball bearings, when utilized in a bearing channel can be easily lost during disassembly of a knife for cleaning. In order to prevent such losses, ball bearings or roller bearings are included in a housing which forms a bearing cage configuration that holds the loose bearings in a contained assembly. Caged or other bearing assembles are relatively thick in width or have a significant size such that either the blade and/or the handle scales require additional milling to include a recess for the assembly. Often, rigid bearing surfaces such as an additional washer are necessary to keep the roller bearings from contacting a relatively softer handle scale material. The additional milling of the handle scales and/or blade tang sometimes cause significant loss of structural material while thereby making the knife less strong, due to the loss of material needed to fit the caged bearings. Lubrication is often needed to maintain free bearing movement within the cage or bearing housing. Still further, caged or loose bearings have a significant tendency to collect grit thereby causing a reduction in ease of opening and/or closing the blade.

In view of the above, the art still needs a construction for improving the opening and closing of a folding implement, in particular knives, that addresses the problems of the prior art systems.

SUMMARY OF THE INVENTION

The problems of the prior art and others are solved with the folding implement of the present invention which has bearing system for a rotatable tool such as a knife. The bearing system includes fixed bearing surfaces on each of the two scales or sides of the handle that contact the blade or tool as it rotates between opened and closed positions. The structural arrangement provides significant benefits. The bearing system does not include any loose parts that can be damaged or lost during disassembly of the implement for cleaning. Lubrication is unnecessary, but can be used if desired. The construction does not require a significant amount of milling as compared to recesses which need to be formed when bearing cages or washers of the prior art utilize.

Still further in one embodiment or aspect, the tang of the blade or tool is free of milling around the pivot axis other than the aperture through which a pin or part is extended in order to rotatably secure the blade or tool to the handle.

In an additional embodiment or aspect, the construction of the present invention provides a highly stable blade as the bearing surfaces can be placed further from the pivot axis as desired.

In yet another embodiment or aspect, the folding implement includes a bearing surface that allows the blade to sweep across the bearing surface without any movement required by the latter. This significantly reduces the ability for debris or grit to cause an obstruction to free movement of the blade or tool in relation to the bearing surface.

In an additional embodiment or aspect, the bearing surface comprises a plurality of ceramic bearings that provide a long life to the folding implement and ideally do not need to be replaced, repaired or polished.

In a further embodiment or aspect, the bearing system comprises a plurality of cavities disposed around a pivot axis of the blade or tool tang in which bearings, preferably ceramic bearings are press fit, with at least a portion of height of the bearings extending outwardly from the plane of the scale adjacent to the bearing. Thus, the bearings crest the surface and protrude a sufficient distance so that a gap is produced between the tool or blade and the handle scales such that the blade or tool does not touch or interfere with the scales on each side of the blade or tool during pivoting between the open position and the closed position.

In yet a further embodiment or aspect, the bearing system can be utilized with substantially any blade or tool locking mechanism such as, but not limited to a lock bar, axis type lock or a backlock.

In yet another embodiment or aspect, the folding implement is free of a washer, caged ball bearings and cage roller bearings centered around the pivot axis.

In one aspect a folding knife is disclosed, comprising a handle comprising a first scale, a second scale fixed at a distance from the first scale and a blade pocket located between the first scale and the second scale; a blade having a cutting edge and a tang, wherein the blade is pivotally coupled to the handle between an open position and a closed position wherein at least a portion of the cutting edge is disposed in the blade pocket; wherein the knife has a pivot axis about which the blade pivots, wherein the pivot axis extends through the first scale, second scale and a pivot aperture in the blade tang, wherein each scale includes a fixed bearing surface between a main plane of the scale and blade tang which directly contacts the blade tang during pivoting of the blade.

In a further aspect, the bearing surface has a Rockwell hardness greater than a Rockwell hardness of the blade tang.

In still a further aspect, the bearing surface includes at least three ball bearings fixedly connected to each scale.

In yet another aspect, the bearing surface includes at least six bearings.

In a further aspect, ball bearings are ceramic bearings.

In still a further aspect, the ball bearings are disposed around the pivot axis.

In yet another aspect, the bearing surface has a Rockwell hardness of at least 80.

In a further aspect, a pin extends through the first scale, second scale and blade tang on the pivot axis about which the blade rotates.

In still a further aspect, each ball bearing is imbedded and fixed in a bearing cavity in the scale.

In yet another aspect, at least 1%, 5%, 10% or 25% of a height of the ball bearing extends outwardly from the plane of the inner surface of the scale.

In a further aspect, at most 49% of a height of the ball bearing extends outwardly from the plane of the inner surface of the scale.

In still a further aspect, the knife is free of each of a washer, caged ball bearings and roller bearings adjacent the pivot axis.

In one aspect, a folding implement is disclosed, comprising a handle comprising a first scale, a second scale fixed at a distance from the first scale and a tool pocket located between the first scale and the second scale; a tool having a tang, wherein the tool is pivotally coupled to the handle between an open position and a closed position, wherein at least a portion of the tool is disposed in the tool pocket; wherein the implement has a pivot axis about which the tool pivots, wherein the pivot axis extends through the first scale, second scale and a pivot aperture in the tool tang, wherein each scale includes a fixed bearing surface between a main plane of the scale and tool tang which directly contacts the tool tang during pivoting of the tool.

In a further aspect, at least one of the first scale and the second scale do not include the fixed bearing surface and instead incorporate one or more of a washer, a roller bearing and caged bearings.

For the sake of completeness and clarity, it is to be understood that each of the above embodiments and aspects can be utilized individually or combined in any combination.

BRIEF DESCRIPTION OF THE DRAWINGS

The invention will be better understood and other features and advantages will become apparent by reading the detailed description of the invention, taken together with the drawings, wherein:

FIG. 1 is an exploded, right-side perspective view of one embodiment of a folding implement, in particular a knife, showing the blade of the knife in an open or extended position;

FIG. 2 is an exploded, left-side perspective view of the embodiment illustrated in FIG. 1.

FIG. 3A is a perspective view of the embodiment illustrated in FIG. 1, wherein the right side scale has been removed to show more detail of the inner features of the knife, wherein the blade is shown in phantom, which reveals the fixed bearing surface;

FIG. 3B is the same view shown in FIG. 3A, with the blade shown in a closed position;

FIG. 5A is a perspective view of one embodiment of a right side scale including a fixed bearing surface in the form of ball bearings fixed in cavities of the scale;

FIG. 5B shows an alternative arrangement of ball bearings fixed in cavities of the scale;

DETAILED DESCRIPTION OF THE INVENTION

Figure 4A:
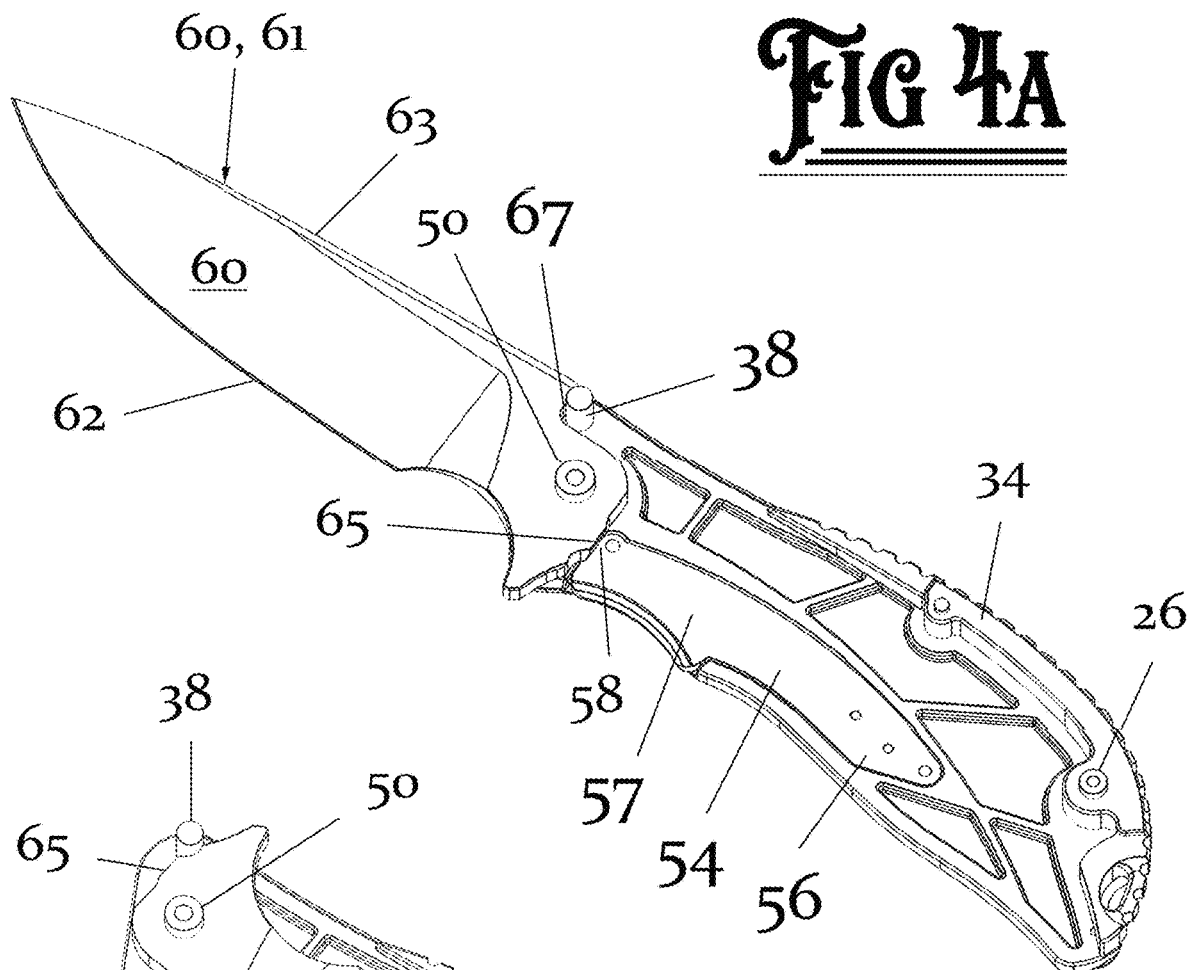
FIG. 4A is a left-side perspective view of the implement illustrated in FIG. 1 with the left-side scale removed and the blade shown in the opened position.

This description of preferred embodiments is to be read in connection with the accompanying drawings, which are part of the entire written description of this invention. In the description, corresponding reference numbers are used throughout to identify the same or functionally similar elements. Relative terms such as "horizontal," "vertical," "up," "upper", "down," "lower", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and are not intended to require a particular orientation unless specifically stated as such. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Figure 6A:
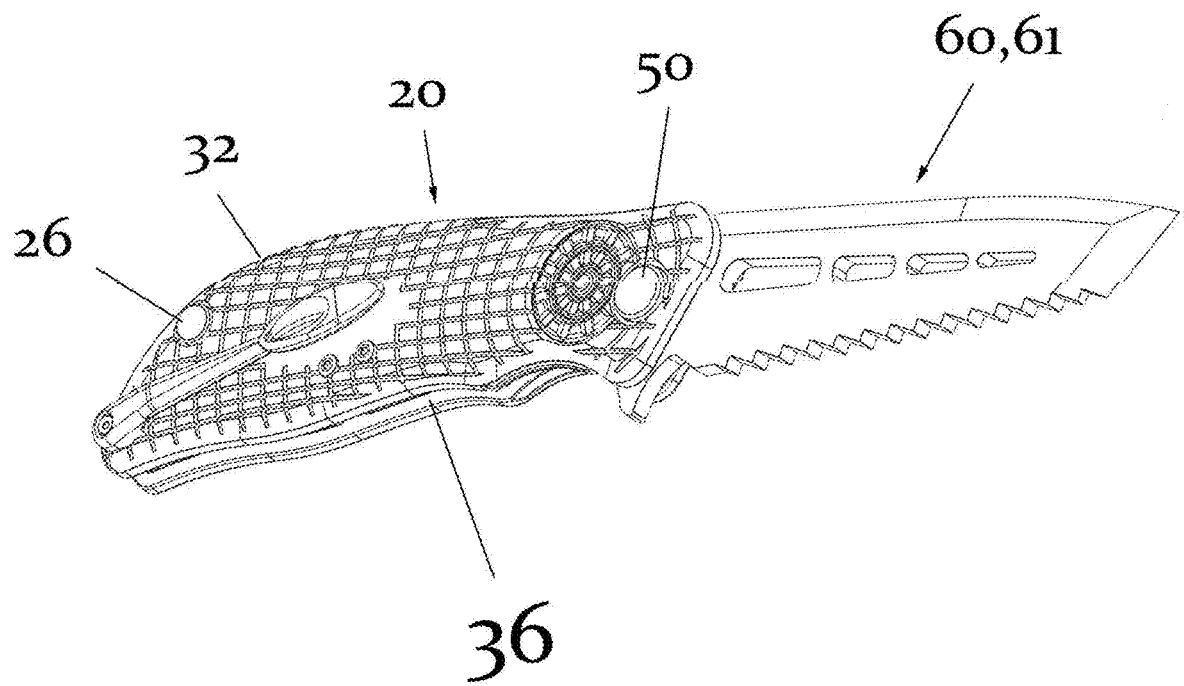
FIG. 6A is a perspective view of a further embodiment of a folding implement having an alternative tool configuration.
Figure 6B:
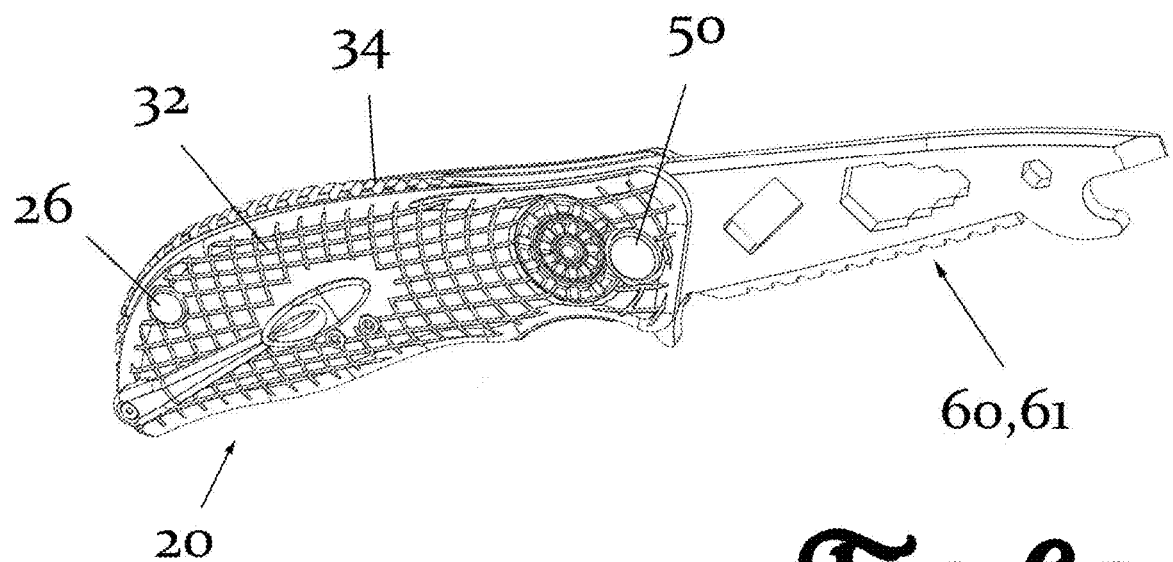
FIG. 6B is a perspective view of a further embodiment of a folding implement having a second alternative tool configuration.

Turning now to the drawings, wherein like parts are referenced by the same reference numbers throughout the several views, FIGS. 1-5A illustrate one embodiment of a folding implement 10, in particular a folding knife, of the present invention. Implement 10 includes a handle 20 and a folding tool 60, in particular a blade 61. However, it is to be understood that the folding tool can be any other useful construction commonly utilized in similar implements, such as multi-tools for example, other tools include are not limited to files, screwdrivers, sockets, can openers and combinations thereof, such as show in FIGS. 6A and 6B. The blade 61 is pivotally coupled to the handle 20 and pivots on pivot axis 12, illustrated in FIGS. 3A and 4A, between the open position shown in FIG. 1 and a closed position, see FIGS. 3B and 4B, wherein cutting edge 62 is at least partially hidden or otherwise disposed inside the handle. Blade 61 is operatively and rotatably connected to the handle 20 through bearing system 80 which is described further hereinbelow. The lower surface of the blade 61 includes a cutting edge 62 extending along at least a length of the blade 61 and an upper end 63 located opposite cutting edge 62.

Handle 20 is utilized to wield implement 10 and has a first end 22 through which the blade 61 is operatively connected and a rear end 24 which also may be considered the butt end of the knife.

Handle 20 comprises a frame having a first side or scale 30, which also can be considered the left side of the handle. Handle 20 also includes a second side or scale 32 which can be considered the right side of the handle. First scale 30 is fixedly connected to second scale 32 utilizing one or more fasteners 26.

A spacer 34 is disposed between first scale 30 and second scale 32 which aids in maintaining a desired distance between first scale 30 and second scale 32. In the embodiment illustrated, fastener 26 extends through each of first scale 30, second scale 32 and spacer 34 located therebetween. It is important to note that the spacer configuration illustrated is only one particular embodiment and spacers of different sizes and shapes can be utilized. Two or more spacers 34 are utilized in other embodiments. Spacer 34 also aids in creating tool or blade pocket 36, see FIG. 6A which houses at least a portion of tool 60 or blade 61 when in the closed position.

As illustrated in FIGS. 1 and 2, a locking arm 54 is operatively connected to second scale 32 for locking blade 61 against movement in the open position. Locking arm 54 includes a locking arm fixed end 56 that is connected to second scale 32 in any suitable manner. FIG. 4A illustrates that the fixed end 56 with locking arm 54 is housed in a recessed section of scale 32 and secured via fasteners in the form of pins that prevent movement of the fixed end in relation to the scale. The free end 57 opposite the fixed end 56 includes a blade lock 58 that engages tang rear edge 65 when the blade 61 is in the open position in order to prevent closure of the blade. Locking arm 54 can be released from the lock position by moving the free end of the locking arm laterally away from the rear edge 65 of blade 61 and toward second scale 32, thereby allowing the blade to be folded into the handle 20.

It is important to note that the locking mechanism illustrated in the drawings is one of many locking mechanisms that be incorporated into the implement 10 of the present invention. Alternative locking mechanisms that are suitable include, but are not limited to, back locks, axis-style locks, integral frame locks, sub-frame locks, button locks, and the like.

Figure 4B:
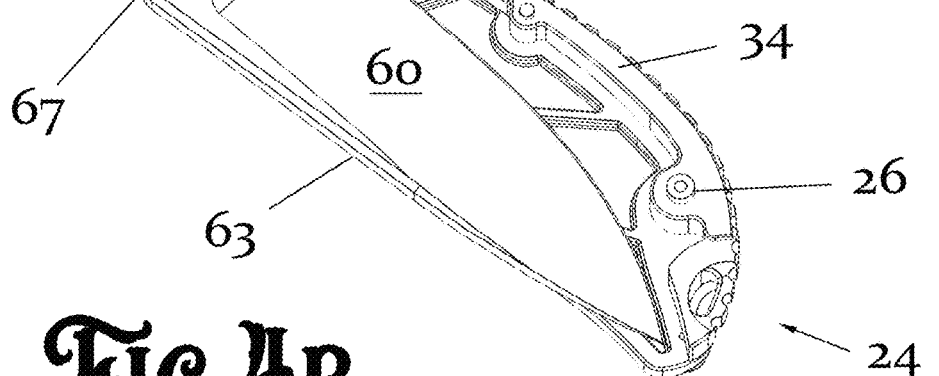
FIG. 4B is the same view shown in FIG. 4A, with the blade shown in the closed position.
Figure 8A:
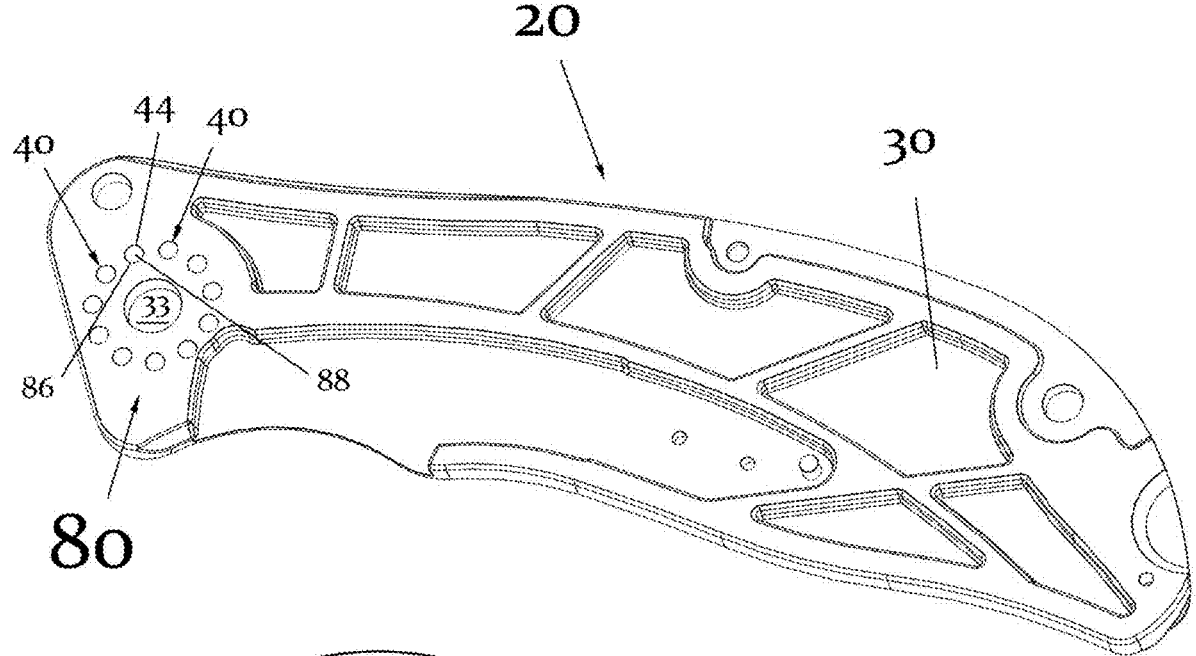
Figure 8B:
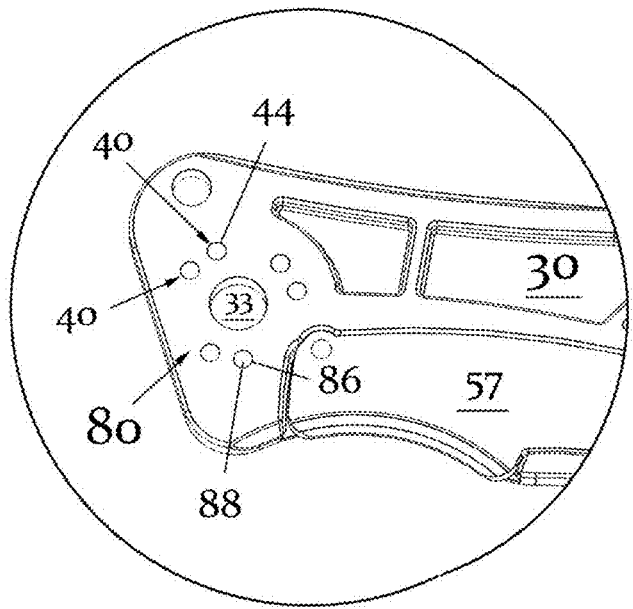

As illustrated in FIGS. 4A and 4B, blade stop 38, which is in the form of a pin, is connected to one of the scales, second scale 32 as illustrated, in order to stop further upward rotation of blade 61 by engaging tang blade stop 67.

It should be also understood by one of ordinary skill in the art that the tool or blade stop mechanism illustrated can be substituted with other blade stop mechanisms which are known in the art. Alternative blade stop mechanisms include, but are not limited to, internal blade stops attached to the blade, internal blade stops attached to the scales with a slot and the base, external blade stops, or any other mechanism that arrests motion of the blade at a specific user position.

Bearing system 80 of the present invention provides smooth rotation of the tool or blade 60 and quick opening of the implement such as the knife illustrated, among other benefits discussed herein. Bearing system 80 includes a first bearing surface 82 fixed to first scale 30 and a second bearing surface 84 fixed to second scale 32. The bearing surfaces protrude outwardly from the main plane of the scale adjacent thereto. In the embodiments illustrated, the bearing system includes ball bearings 86 which are fixedly connected within individual bearing cavities 40 present in each of first scale 30 and second scale 32. For the sake of clarity, the ball bearings do not rotate.

Each bearing cavity 40 is essentially a depression or recess formed in one of the scales 30, 32 at a location adjacent axis 12. FIG. 5A illustrates a plurality of cavities, namely eleven cavities, in scale 30 disposed preferably equidistant around pivot aperture 33 through which pin 50 extends in order to rotatably connect the blade 60 to handle 20.

It is to be understood that any number of bearing cavities 40 can be utilized. Generally, at least three bearing cavities are present, each housing a single bearing 86 to provide smooth operation of the blade. Bearing cavities can be formed utilizing standard milling equipment or any other means known to those of ordinary skill in the art. A greater number of bearings aids in blade support and also increases the smoothness of rotation of the blade. Each cavity includes a sidewall 44 and a base. Ball bearings 86 are affixed to the cavity utilizing any suitable method so that they do not rotate.

In one embodiment, a ball bearing 86 is pressed into a bearing cavity 40. To accomplish this, the ball bearing 86 has a diameter that is slightly greater than the diameter of bearing cavity 40.

Each ball bearing 86 present is preferably fixed so that the bearing apex 88 of all ball bearings are at the substantially same elevation with respect to the inner surface of the scale at plane 42. Thus, the ball bearings 86 crest the surface of the plane. A small gap is produced between the blade 61 and handle scales 30, 32 such that the blade 61 does not touch or interfere with the scales 30, 32 on both sides of the blade.

In order to provide smooth operation and durability, each of the first bearing surface and a second bearing surface, namely ball bearings 86 have a Rockwell hardness greater than the Rockwell hardness of the blade 61. The bearing surface has a Rockwell hardness of at least 80. In a highly preferred embodiment, the bearing system 80 comprises ceramic bearings.

In various embodiments of the invention, at least three ball bearings are affixed to each scale. The ball bearings can be present and fixed in any desired pattern, which can vary upon the application of the implement or space allotted. As shown in FIG. 5B, regular patterns can be used. In a preferred embodiment, the bearing pattern is co-radial so that all bearings contact the blade or tool along the same radius or path of the tool 60. This allows the least friction and fastest break-in-period because all the bearings present wear along the same, circular path. The ball bearings can be arranged in any manner that provides lateral structural support for the tool or blade through its path from the stored, closed position to the open, user position.

The bearing system provides significant benefits over the use of plastic washers, metal washers, caged ball bearings and caged roller bearings. The bearing system 80 contains no loose bearings that can be damaged or lost during disassembly for cleaning of the implement 10. No lubrication is needed, but can be used. Still further, the tang of the blade does need to be milled in order to include a recess for a washer or bearing. The fixed bearing surface also can be placed further from the pivot axis which in turn provides additional strength to the implement 10. The blade 61 also sweeps across the fixed bearings rather than rolling when having bearings roll across the blade. Thus, the construction of the bearing system of the present invention reduces the ability for grit to get into caged bearings or between a washer and the blade cause a reduction in free movement.

In order to affix blade 61 to handle 20, tang 64 includes a pivot aperture 66. Pivot aperture 66 is aligned with apertures 33 in each scale. Pin 50 is extended through each aperture 33 and pivot aperture 66 and secured utilizing nut 52. Other securing arrangements can be utilized as known to those of ordinary skill in the art so long as blade 61 is pivotable in relation to handle 20.

From a closed position, implement 10 can be opened by depressing blade actuator 68 with a finger which causes the blade to rotate outwardly from handle. In other embodiments, the upper end 63 can be grasped and pulled away, outwardly from handle so that blade 61 is rotated around pivot axis 12. It is to be understood that other methods can be utilized to open the blade when different opening mechanisms are utilized, for example, but not limited to, thumb studs, nail grooves, buttons, gravity, apertures in the blades, protrusions along the blade tang that allow for front flip opening or top flip opening. The opening methods are many and do not have bearing on the function of this invention.

In additional embodiments, the knife can be an assisted-opening knife or an automatic knife and therefore include an additional biasing element, such as a spring, operatively connected to the blade in order to apply an opening force to the blade. Such biasing elements are operable to apply an opening force to the blade after pressure is applied to the blade to pivot the blade from the closed position to an intermediate position between the closed position and the opened position. When the blade reaches an intermediate position, the force asserted by the biasing element causes the blade to further pivot from the intermediate position to the open position. Such spring configurations for assisted-opening knives are well known in the art and herein incorporated by reference.

For the avoidance of doubt, the devices and methods of the present invention encompass all possible combinations of the components, including various ranges of said components, disclosed herein. It is further noted that the term 'comprising' does not exclude the presence of other elements. However, it is also to be understood that a description of a product comprising certain components also discloses a product consisting of these components. Similarly, it is also to be understood that a description on a process comprising certain steps also discloses a process consisting of these steps.

In accordance with the patent statutes, the best mode and preferred embodiment have been set forth; the scope of the invention is not limited thereto, but rather by the scope of the attached claims.

What is claimed is:

1. A folding knife, comprising:
    a handle comprising a first scale, a second scale fixed at a distance from the first scale and a blade pocket located between the first scale and the second scale;
    a blade having a cutting edge and a tang, wherein the blade is pivotally coupled to the handle between an open position and a closed position wherein at least a portion of the cutting edge is disposed in the blade pocket;
    wherein the knife has a pivot axis about which the blade pivots, wherein the pivot axis extends through the first scale, the second scale and a pivot aperture in the blade tang,
    a bearing system including a first bearing surface fixed to the first scale and a second bearing surface fixed to the second scale,
    wherein the first bearing surface and the second bearing surface are located between a main plane of its respective one of the scales and the blade tang and directly contact the blade tang during pivoting of the blade and
    wherein the first bearing surface and the second bearing surface do not rotate.

2. The folding knife according to claim 1, wherein each of the first bearing surface and the second bearing surface has a Rockwell hardness greater than a Rockwell hardness of the blade tang.

3. The folding knife according to claim 2, wherein each of the first bearing surface and the second bearing surface includes at least three ball bearings fixedly connected to the respective one of the scales such that the ball bearings do not rotate.

4. The folding knife according to claim 3, wherein the at least three ball bearings include at least six ball bearings.

5. The folding knife according to claim 3, wherein the ball bearings are ceramic bearings.

6. The folding knife according to claim 5, wherein the ball bearings are disposed around the pivot axis.

7. The folding knife according to claim 2, wherein the first bearing surface and the second bearing surface have a Rockwell hardness of at least 80.

8. The folding knife according to claim 2, wherein a pin extends through the first scale, the second scale and the blade tang on the pivot axis about which the blade rotates.

9. The folding knife according to claim 3, wherein each of the ball bearings is imbedded and fixed in a bearing cavity in the respective one of the scales.

10. The folding knife according to claim 9, wherein at least 1% of a height of the ball bearing extends outwardly from the main plane of an inner surface of the respective one of the scales.

11. The folding knife according to claim 10, wherein at most 49% of a height of the ball bearing extends outwardly from the main plane of the inner surface of the respective one of the scales.

12. The folding knife according to claim 1, wherein the knife is free of each of a washer, caged ball bearings and roller bearings adjacent the pivot axis.

13. A folding implement, comprising:
    a handle comprising a first scale, a second scale fixed at a distance from the first scale and a tool pocket located between the first scale and the second scale;
    a tool having a tang, wherein the tool is pivotally coupled to the handle between an open position and a closed position, wherein at least a portion of the tool is disposed in the tool pocket;
    wherein the implement has a pivot axis about which the tool pivots, wherein the pivot axis extends through the first scale, the second scale and a pivot aperture in the tool tang,
    wherein a bearing system including a first bearing surface is fixed to one of the first scale and the second scale, wherein the first bearing surface is located between a main plane of the one of the scales and the tool tang which directly contacts the tool tang during pivoting of the tool, and
    wherein the first bearing surface does not rotate.

14. The folding implement according to claim 13, wherein the first bearing surface has a Rockwell hardness greater than a Rockwell hardness of the tool tang.

15. The folding implement according to claim 14, wherein the first bearing surface includes at least three ball bearings fixedly connected to the one of the scales such that the ball bearings do not rotate.

16. The folding implement according to claim 15, wherein the ball bearings are ceramic bearings.

17. The folding implement according to claim 14, wherein the first bearing surface has a Rockwell hardness of at least 80.

18. The folding implement according to claim 15, wherein each ball bearing is imbedded and fixed in a bearing cavity in the one of the scales, wherein at least 1% of a height of the ball bearing extends outwardly from the main plane of an inner surface of the one of the scales, and wherein at most 49% of a height of the ball bearing extends outwardly from the main plane of the inner surface of the scales.

19. The folding implement according to claim 18, wherein the bearing system does not include a bearing surface fixed to the other of the first scale and the second scale and instead incorporates one or more of a washer, a roller bearing and caged bearings.

20. The folding implement according to claim 13, wherein the implement is free of each of a washer, caged ball bearings and roller bearings adjacent the pivot axis.

* * * * *